US006865296B2

(12) United States Patent
Nagao (10) Patent No.: US 6,865,296 B2
(45) Date of Patent: Mar. 8, 2005

(54) PATTERN RECOGNITION METHOD, PATTERN CHECK METHOD AND PATTERN RECOGNITION APPARATUS AS WELL AS PATTERN CHECK APPARATUS USING THE SAME METHODS

(75) Inventor: Kenji Nagao, Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 676 days.

(21) Appl. No.: 09/874,199

(22) Filed: Jun. 5, 2001

(65) Prior Publication Data

US 2002/0018596 A1 Feb. 14, 2002

(30) Foreign Application Priority Data

Jun. 6, 2000 (JP) ........................................ 2000-168560

(51) Int. Cl.$^7$ ................................................ G06K 9/62
(52) U.S. Cl. ...................... 382/209; 382/159; 382/205; 382/224
(58) Field of Search ................................ 382/115, 118, 382/159, 170, 181, 190, 192, 195, 197, 209, 218, 224, 225, 228

(56) References Cited

U.S. PATENT DOCUMENTS

| | | | | |
|---|---|---|---|---|
| 4,914,703 A | * | 4/1990 | Gillick | 704/245 |
| 5,164,992 A | | 11/1992 | Turk et al. | |
| 5,842,194 A | * | 11/1998 | Arbuckle | 706/52 |
| RE36,041 E | * | 1/1999 | Turk et al. | 382/118 |
| 6,405,065 B1 | * | 6/2002 | Malin et al. | 600/310 |

FOREIGN PATENT DOCUMENTS

| | | |
|---|---|---|
| EP | 0 944 018 | 9/1999 |
| JP | 4-101280 | 4/1992 |

OTHER PUBLICATIONS

Belhumeur, et al. "Eigenfaces vs. Fisherfaces: Recognition Using Class Specific Linear Projection", Department of Electrical Engineering, Yale University, pp. 1–34, Jul. 1997.*
Wei "308–766A Shpe Analysis in Computer Vision Final Project Report: Face Recognition", Department of Electrical Engineering, McGill University, pp. 1–26, Dec., 1998.*
European Search Report corresponding to application No. EP 01 11 2830 dated Jun. 16, 2004.
Belhumeur P N, et al: "Eigenfaces vs. Fisherfaces: Recognition Using Class Specific Linear Projection" IEEE Transactions on Pattern Analysis and Machine Intelligence, IEEE Inc. New York, US, vol. 19, No. 7, Jul. 1, 1997, pp. 711–720.
Theodoris, Sergios; Koutroumbas, Konstantinos: "Pattern Recognition" 1999, Academic Press, San Diego, USA, pp. 155–167.
Watanabe H, et al.: Discriminative Metric Design for Robust Pattern Recognition IEEE Transactions On Signal Processing, IEEE, Inc., New York, US, vol. 45, No. 11, Nov. 1, 1997, pp. 2655–2662.
Fukunaga, Keinosuke , Introduction to Statistical Pattern Recognition, Academic Press, Inc., 1972.

* cited by examiner

*Primary Examiner*—Daniel Mariam
(74) *Attorney, Agent, or Firm*—RatnerPrestia (57) ABSTRACT

With respect to two pattern sets obtained on different conditions, a feature-extraction matrix, which maximizes between-class scatter and minimizes within-class scatter, is found respectively. A first feature amount is calculated using one of the feature-extraction matrices. The first feature amount and the two matrices are retained in a referential database. A pattern is determined to a second feature amount—extracted by applying another feature-extraction matrix to a pattern input—by extracting a most similar element out of the first feature amount retained in the referential database.

26 Claims, 5 Drawing Sheets

PATTERN RECOGNITION METHOD, PATTERN CHECK METHOD AND PATTERN RECOGNITION APPARATUS AS WELL AS PATTERN CHECK APPARATUS USING THE SAME METHODS

FIELD OF THE INVENTION

The present invention relates to a pattern recognition method through which an image or a voice is recognized, a pattern check method and a pattern recognition apparatus as well as a pattern check apparatus using these methods.

BACKGROUND OF THE INVENTION

Pattern recognition is to classify images taken by cameras or image scanners into a computer. A voice of an object can be picked up through a microphone and taken into a computer. When the object is a human being, his or her facial image or speech voice is to correspond to the object and then classified. Therefore, the pattern recognition technique is summarized to handle the following two variable factors:

(1) within-class scatter, i.e., showing different scatters in appearance depending on conditions at recording the object although images or voices are derived from the same object; and (2) between-class scatter, i.e., showing different patterns due to different objects.

In conventional art of the pattern recognition, the following method has been highly assessed: First, assume a sample space corresponding to a set of entire patterns, then apply consistent functions to individual input data so that the within-class scatter can be minimized and the between-class scatter can be maximized, thereby extracting features. The method bases on such a fundamental model. For instance, Fisher's discriminant analysis (Fukunaga: Introduction to Statistical Pattern Recognition, Academic Press, 1972) has been well known as a typical example, and it has been often used in the fields of character recognition, voice recognition and facial image recognition.

However, an assumption of Fisher's discriminant analysis method, i.e., a model of which entire patterns are derived from one distribution, seems sometimes unreasonable viewed from actual problems. For instance, when a system, which checks a face photo on an identification with a facial image taken by a video camera, is considered, this one is made by shooting directly an object and that one is taken indirectly from a printed material. These two materials are compared with each other for determining the identity of the two. However, an assumption that the sets of all the images formed through different processes are derived from one distribution is unreasonable because the images on these two materials differ too much. Actually, it is sometimes difficult for an operator to check a man himself against the photo on his identification.

It is thus concluded that Fisher's discriminant analysis method, i.e., entire patterns are described with one distribution and common feature-extraction-functions are consistently applied to input data, which is to be classified, for recognizing patterns, has a limit of accuracy.

The inventor of the present invention filed an application (Publication No. EP 0 944 018) with EPO in order to solve this problem. In this patent application, pattern sets A, B are prepared, where pattern set A is an image pattern directly taken a person's face by a video camera while pattern set B is read a photograph of the same person's face by an image scanner. Thus the two sets are formed of the same object but through different processes. From these two pattern sets, (1) distributions of the patterns are found, and (2) perturbation distribution of individual pattern corresponding between pattern sets A and B, is found, or perturbation distribution of sets of patterns in pattern set A corresponding to each element BI of pattern set B. Then a feature extraction matrix, which minimizes an overlapping cubic volume between the pattern distribution found in (1) and the perturbation distribution found in (2), is found. This feature-extraction-matrix is applied to pattern sets A and B, and each feature amount is calculated. Among the feature amounts, the elements mostly similar to each other are used for determining the identity.

SUMMARY OF THE INVENTION

The present invention aims to carry out a highly accurate pattern recognition and a pattern check by extracting features which satisfy criteria minimizing the within-class scatter and maximizing the between-class scatter with respect to images formed of the same object but through different processes. Perturbation distributions of individual patterns—corresponding between pattern sets A, B used in the application of EP 0 944 018—have been broken down into "within-set within-class scatter" and "between-set within-class scatter". In this context, the class corresponds to a person, and the within-class scatter is a scatter for the same person, and the between-class scatter is a scatter for the different persons.

In the present invention, feature extraction matrix AF of pattern set A and feature extraction matrix BF of pattern set B are found so that these matrices AF and BF maximize the between-class scatter with respect to training pattern sets A and B (a training pattern set: a set in pattern sets A and B, actually used for calculation), where the class is not only within a pattern set but also it extends over another pattern set. The pattern sets A, B are obtained based on plural, e.g., two conditions. The scatter here is a scatter between the patterns corresponding to different classes (different objects). These matrices AF and BF also minimize the within-class scatter with respect to the training pattern sets A and B, where the within-class scatter is a scatter within the classes between patterns A and B corresponding to the same class. These matrices AF and BF are used for calculating feature-amounts of input patterns, and their similarity measures are determined. This method allows a pattern recognition and a pattern check to be superlatively more accurate than conventional methods.

DETAILED DESCRIPTION OF THE PREFERRED EMBODIMENTS

Exemplary embodiments of the present invention are demonstrated hereinafter with reference to the accompanying drawings.

Exemplary Embodiment 1

Figure 1:
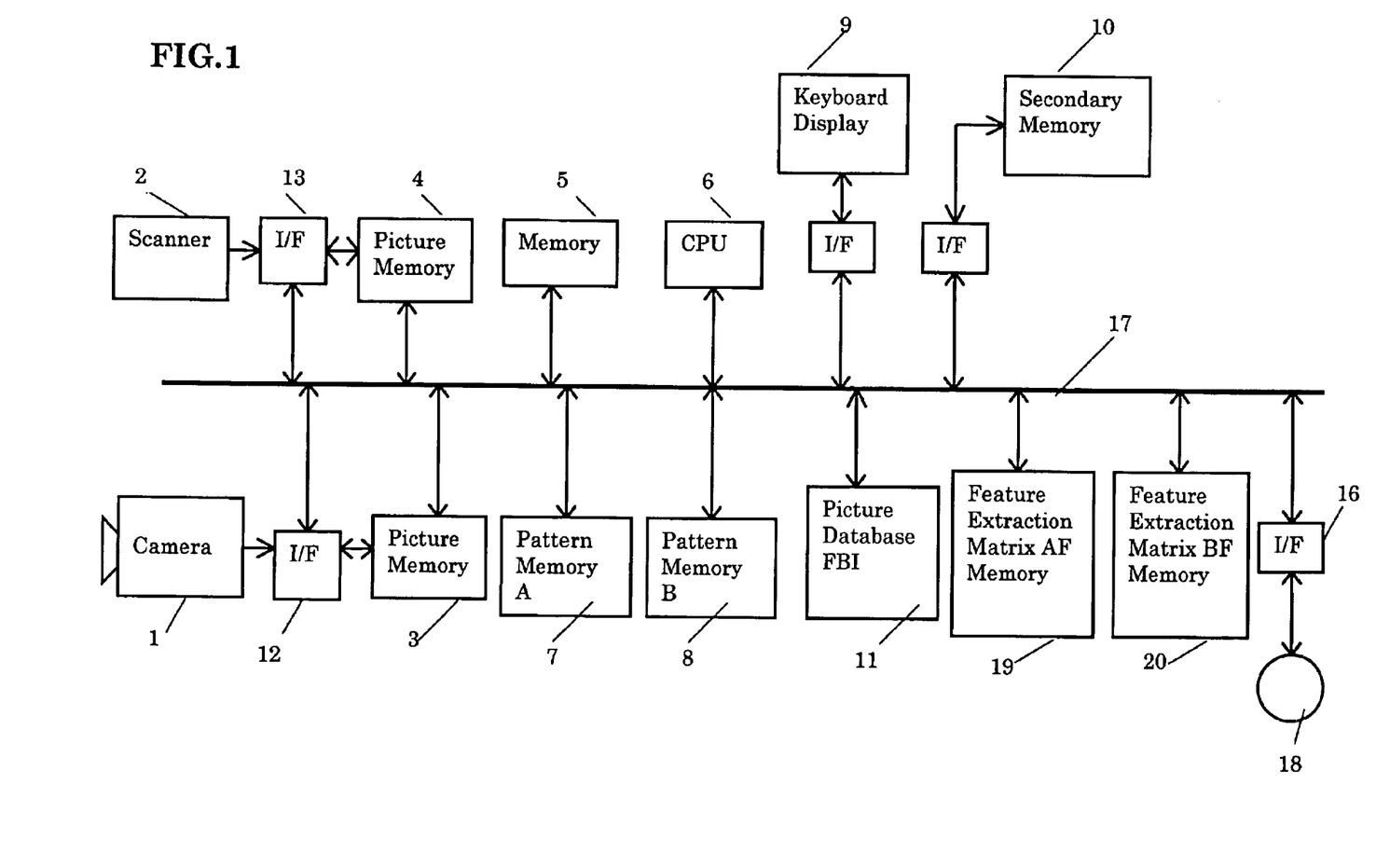
FIG. 1 is a block diagram of a facial image recognition apparatus using a pattern recognition method of the present invention.

FIG. 1 is a block diagram of a facial image recognition apparatus in which the pattern recognition method of the present invention is applied to identification check. The block diagram of the apparatus in FIG. 1 is realized by a computer system.

The facial image recognition apparatus comprises the following elements:

(a) video camera 1 or a digital camera (hereinafter referred to as a video camera) for taking a facial image (pattern set A) of a person directly into an electronic recording medium;

(b) image scanner 2 for taking a face photo (pattern set B) on an identification;

(c) image memory 3 for storing an image signal supplied from video camera 1;

(d) image memory 4 for storing an image signal supplied from image scanner 2;

(e) memory 5 for storing an operation program;

(f) CPU 6 for performing various calculations and operation controls;

(g) pattern memory 7 for storing the image pattern (hereinafter referred to as pattern A) of pattern set A and a feature pattern calculated by extracting features from pattern set A;

(h) pattern memory 8 for storing the image pattern (hereinafter referred to as pattern B) of pattern set B and a feature pattern calculated by extracting features from pattern set B;

(i) a keyboard and display 9 as a system console;

(j) secondary memory device 10 such as a magneto-optic disc for storing large scale data such as image pattern information;

(k) memory 11 for storing feature-extracting matrices (detailed later) and sets of feature-patterns as a data-base (hereinafter referred to as a referential image data-base);

(l) interfaces (I/F) 12–16 for transacting data to/from external devices;

(m) system bus 17;

(n) output terminal 18 for outputting a recognition result;

(o) feature extraction matrix memory 19 for storing feature-extraction-matrix AF for pattern A; and (p) feature extraction matrix memory 20 for storing feature-extraction-matrix BF for pattern B.

The computer system comprises the following elements:

image memories 3, 4;
memory 5;
CPU 6;
pattern memories 7, 8;
memory 11;
interfaces (IFs) 12–16;
system bus 17;
output terminal 18; and
feature extraction matrix memory 19, 20.

An operation of the apparatus is demonstrated hereinafter. In the facial image recognition apparatus, a large number of identifications have been read by image scanner 2 to produce facial-image-data, which are stored in referential image database 11. A facial image of a person is taken by video camera 1. Then recognize whether the person is registered in database 11 or which identification registered in data-base 11 is mostly similar to the person. The process is roughly divided into two sections. One is an off-line process where feature-extraction-matrix AF for video images and feature-extraction-matrix BF for identification images are calculated, and referential-image database 11 is formed. Another one is an on-line process where a facial image input is determined whether it matches anyone registered in database 11, and when it is determined that the facial image matches someone registered in database 11, the registered person mostly similar to the facial image is selected from database 11.

Figure 2:
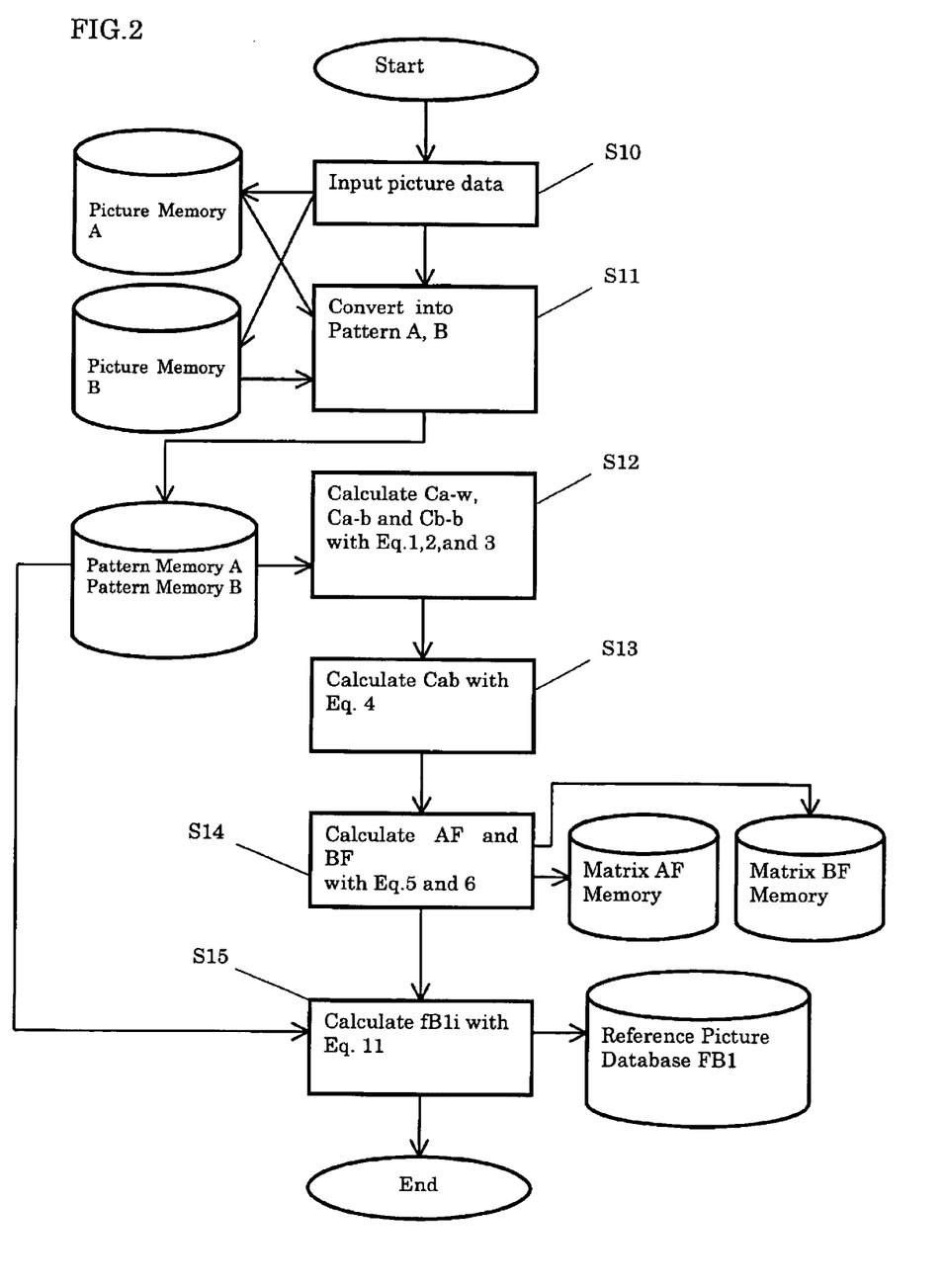
FIG. 2 is a flowchart illustrating an operation of off-line recognition in the facial image recognition apparatus shown in FIG. 1.

In the first place, the off-line process is described with reference to the flowchart shown in FIG. 2. The purpose of the off-line process is to calculate feature extraction matrices AF, BF from training image signals stored in image memories 3 and 4, and to extract a feature vector from the identification images.

The facial images supplied from video camera 1 are stored in image memory 3 via I/F 12 as pattern set A1 (video facial image), and the facial images of identifications taken by image scanner 2 are stored in image memory 4 via I/F 13 as pattern set B1 (identification photo). Respective data are converted into one dimensional data sequence, i.e., pattern A and pattern B, and stored in pattern memories 7, 8 (S11). In this case, generally, video camera 1 produces plural facial images per person, and image scanner produces one facial image from identification images per person.

Feature extraction matrices AF, BF are calculated through steps 12 (S12)–14 (S14). First, within-class scatter matrix Ca–w and between-class scatter matrix Ca–b of pattern set A1 are calculated following equations 1 and 2. In parallel, between-class scatter matrix Cb–b is calculated following equation 3 (S12).

$$Ca\text{-}w = E(i)\{E(j)\{(Xij\hat{\ }a - Mi\hat{\ }a)(Xij\hat{\ }a - Mi\hat{\ }a)\hat{\ }T\}\} \qquad \text{equa. 1}$$

where, $Xij\hat{\ }a$ represents the "j"th image of the class "i" ("I"th person) in pattern set A1, and $Mi\hat{\ }a$ represents an average image of class "i" in pattern set A1, $E(i)\{\cdot\}$ represents an operator which averages $\{\ \}$ with respect to $\{i\ \}$, and $\hat{\ }T$ shows transposition of the matrix and vector.

$$Ca\text{-}b = E(i)\{(Mi\hat{\ }a - M\hat{\ }a)(Mi\hat{\ }a - M\hat{\ }a)\hat{\ }T\} \qquad \text{equa. 2}$$

where, $M\hat{\ }a$ represents an average image of entire pattern set A1.

$$Cb\text{-}b = E(i)\{(Mi\hat{\ }b - M\hat{\ }b)(Mi\hat{\ }b - M\hat{\ }b)\hat{\ }T\} \qquad \text{equa. 3}$$

where, $M\hat{\ }b$ represents an average image of entire pattern set B1.

Next, equation 4 calculates a cross-correlation matrix Cab–r of pattern set A1 and pattern set B1 (S13).

$$Cab\text{-}r = E(i)\{(Mi\hat{\ }a)(Mi\hat{\ }b)\hat{\ }T\} \qquad \text{equa. 4}$$

Then equations 5, 6 calculate feature-extraction-matrices AF, BF with respect to pattern sets A1, B1 (S14).

$$AF = (P1w)\hat{\ }T\ Ca\text{-}w^{-\frac{1}{2}} \qquad \text{equa. 5}$$

where, P1w represents a matrix of eigenvector corresponding to "m" pcs. of maximum eigenvalues of matrix $(Ca\text{-}w^{-\frac{1}{2}})Ca\text{-}b(Ca\text{-}w^{-\frac{1}{2}})$, where $K^{(-\frac{1}{2})}$ represents a positive semi-definite square root matrix with respect to matrix K.

$$BF = Q\ P2b\hat{\ }T\ Cb\text{-}b^{-\frac{1}{2}} \qquad \text{equa. 6}$$

where, matrix P2b represents an orthogonal matrix obtained by singular value decomposition of matrix $C0 = Ca\text{-}b^{(-\frac{1}{2})}$ Cab–r Ca–b$^{(-\frac{1}{2})}$, and satisfies C 0(P2b)=(P1b)D. "D" represents a diagonal matrix, P1b shows an orthogonal matrix, matrix Q=(P1w)^T(Ca–w)$^{(-\frac{1}{2})}$R*, where R* is a quasi-inverse matrix of matrix R=(P2b)^T(Ca–b)$^{(-\frac{1}{2})}$.

The validity of this feature-extraction function is described as follows: First, between Cab–r and matrix Cab–w, a relation shown by equation 8 exists. Within-class scatter matrix Cab–w shown by equation 7 extends over pattern set A1 and pattern set B1. In this connection, the minimization of Cab–w is equivalent to the minimization of Ca–b and Cb–b, as well as the maximization of Cab–r.

$$Cab-w=E(i)\{(Mi\hat{}a-Mi\hat{}b)(Mi\hat{}a-Mi\hat{}b)\hat{}T\} \quad \text{equa. 7}$$

$$Cab-w=Ca-b+Cb-b-2Cab-r \quad \text{equa. 8}$$

Assessment standard S shown by equation 9 minimizes the within-class scatter of respective pattern sets A1, B1, and is maximized when it maximizes the between-class scatter only when the scatter extends over two pattern sets A1, B1.

$$S=tr[Ca-w^{-1}Ca-b]-2tr[(Ca-b+Cb-b)^{-1}Cab-w] \quad \text{equa. 9}$$

Feature extraction functions fa=AF(X^a), fb=BF(X^b), which maximize assessment standard S, agree with feature extraction matrices AF, BF which maximize equation 10.

$$S=tr[Ca-w\hat{}(-1)Ca-b]+2tr[(Ca-b+Cb-b)-Cab-r]-I \quad \text{equa. 10}$$

where, "I" represents a unit matrix.

One of quasi-optimum feature-extraction-matrices is AF or BF shown by equa. 5 or 6. These matrices maximize equation 10.

Then in order to build a referential image database 11, plural facial images of identifications are taken by image scanner 2. Feature vector "fB1i" is calculated using matrix BF and following equation 11 with respect to typical pattern B1i of respective classes (respective persons), and the vector is registered to database 11 (S15).

$$fB1i=FB(B1i) \quad \text{equa. 11}$$

The descriptions above have discussed the off-line process.

Figure 3:
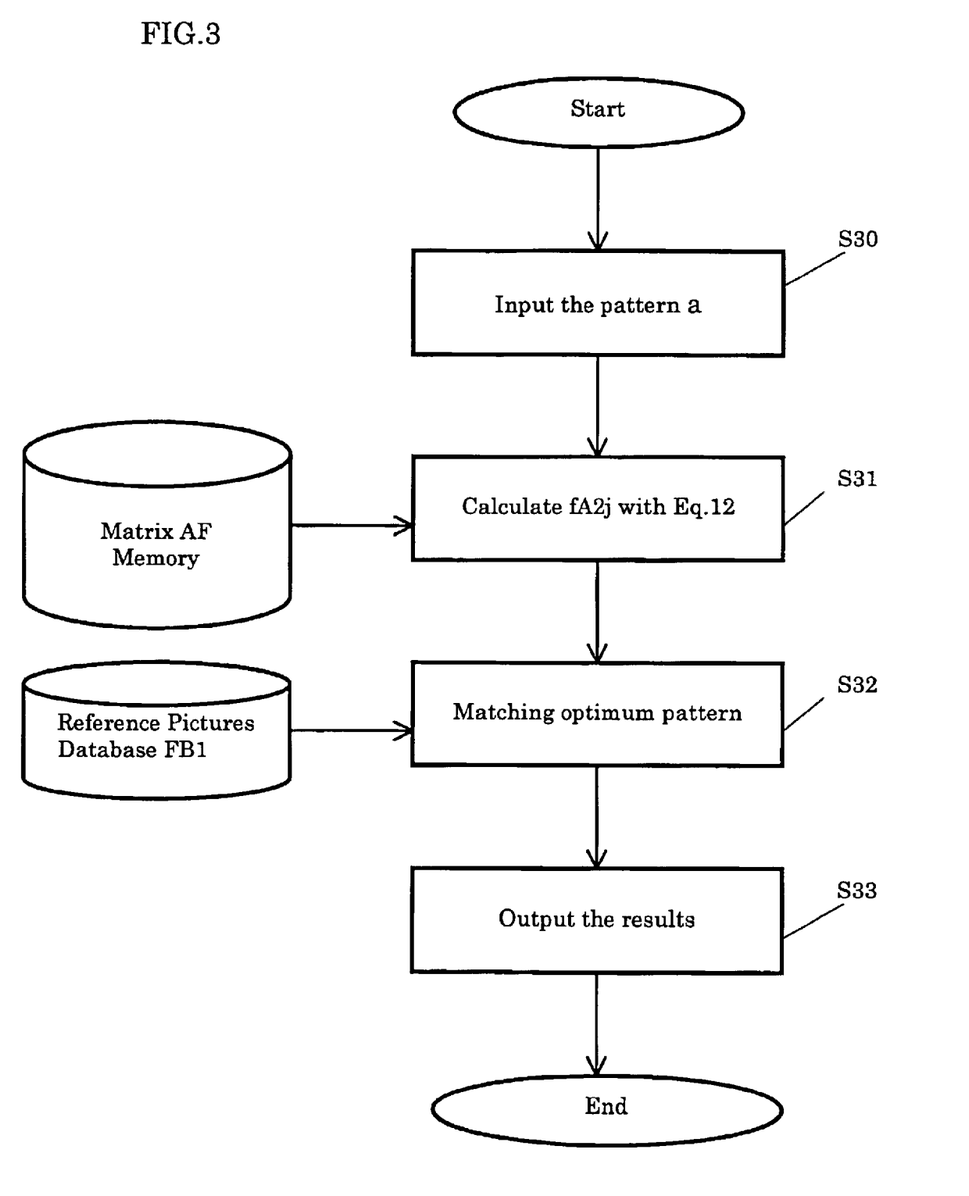
FIG. 3 is a flowchart illustrating an operation of on-line recognition in the facial image recognition apparatus shown in FIG. 1.

The on-line process is now demonstrated hereinafter with reference to the flowchart shown in FIG. 3. The purpose of the on-line process is to determine whether a facial image input matches a person registered in referential image database 11, and to select the most similar one from the database when it matches one of registered persons.

A facial image directly taken by video camera 1 is stored in image memory 3, then pattern "a" input is converted into one-dimensional data "pattern A2j", which then transferred to pattern memory 7 (S30). Feature-extraction-matrix AF, found in the off-line process and stored in memory 19, is applied to pattern A2j stored in memory 7, then feature vector fA2j is calculated following equation 12 (S31).

$$fA2j=AF(A2j) \quad \text{equa. 12}$$

Next, vary entry-index "i" of database 11 so that a feature vector similar to fA2j is selected from database 11, and an optimum matching process is carried out (S32). At least one result of the process is output as a recognition result to output terminal 18 (S33).

In the description discussed above, referential image database 11 is formed by collecting facial images from identifications through image scanner 2; however, database 11 can be formed by inputting facial images through video camera 1. Image scanner 2 and video camera 1 are used as pattern input means; however, either one or another input means is acceptable.

Facial image data, pattern sets A1, B1 and database 11 are produced in the off-line process; however, those materials may have been stored in secondary memory device 10 so that they can be retrieved from memory device 10.

In this embodiment, the facial image recognition apparatus is used as an example; however, image data of cars, assembled parts, or voice data, character data can be converted into pattern data, so that the apparatus can be used as a pattern recognition apparatus, and various applications can be expected.

Exemplary Embodiment 2

A facial image checking apparatus, in which a pattern check method is applied to identification check, is demonstrated hereinafter. The apparatus in accordance with the second embodiment has the same block diagram as that shown in FIG. 1. Thus the block diagram and the description thereof are omitted here.

The facial image checking apparatus is used for determining whether or not a facial image taken from an identification is identical with another facial image taken by a video camera. The determination process is divided into two sections. One is an off-line process comprising the steps of:

(a) obtaining facial images from a lot of identifications through image scanner 2;

(b) obtaining a facial image by shooting a person's face with video camera 1; and (c) calculating feature-extraction-matrices AF, BF from these facial images.

Another section is an on-line process comprising the steps of:

(d) calculating a feature amount using matrices AF, BF from the facial image (pattern A) supplied from image scanner 2 and the facial image (pattern B) supplied from video camera 1; and (e) determining whether or not both the facial images are identical based on similarity measure of the feature amounts.

Figure 4:
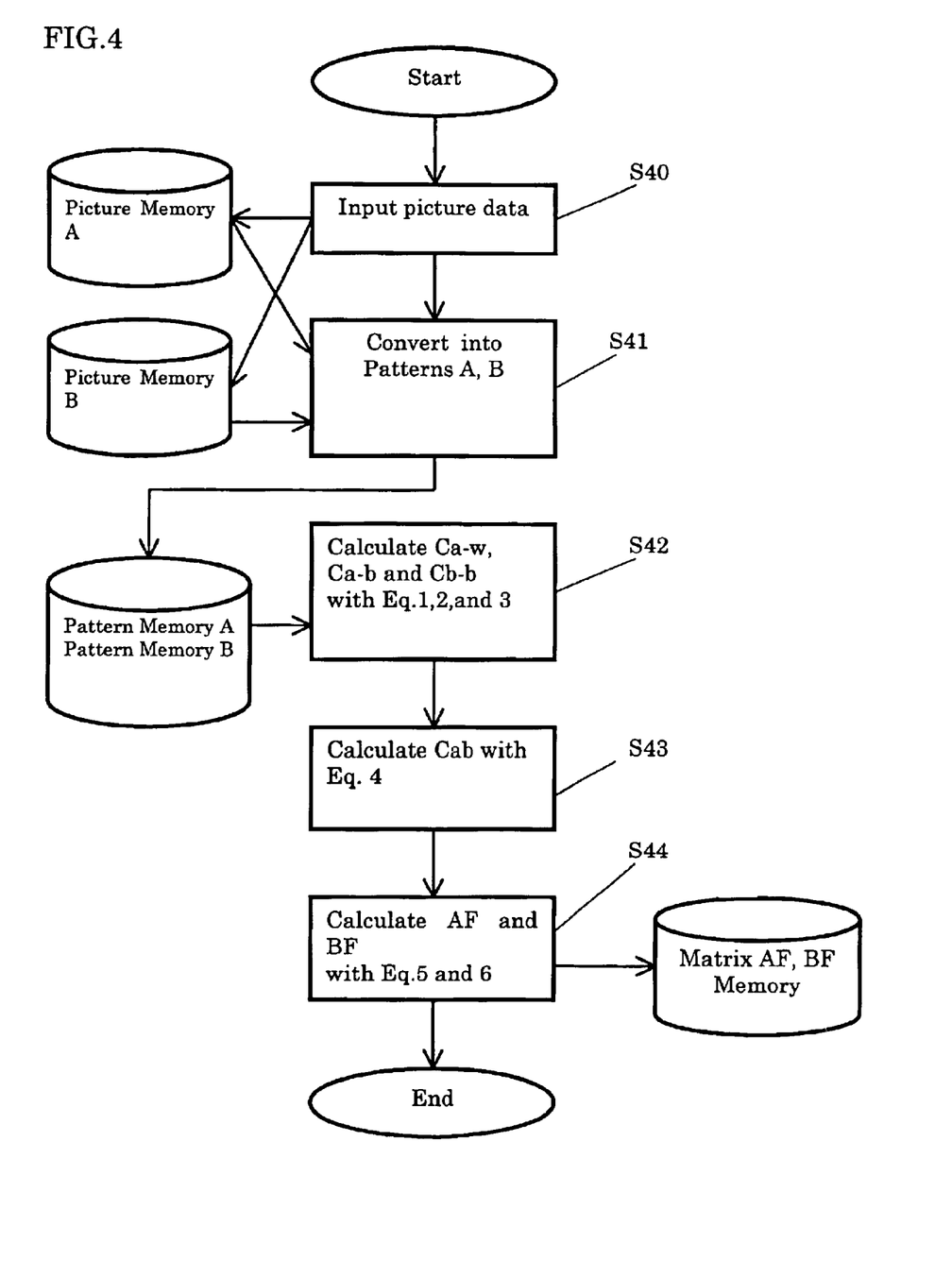
FIG. 4 is a flowchart illustrating an operation of off-line facial image check using a pattern check method of the present invention.

In the first place, the off-line process is demonstrated with reference to the flowchart shown in FIG. 4. The purpose of the off-line process is to calculate feature-extract-matrices AF, BF.

First, an image signal of a person's face shot by video camera 1 is stored in image memory 3 via I/F 12. At the same time, a facial image is taken from the person's identification by image scanner 2 and stored in image memory 4 via I/F 13 (S40). This procedure is repeated until a necessary number of images enough for feature extraction matrix F to learn is collected (e.g. 15,000 persons).

The facial images taken by video camera 1 are stored in memory 3 as pattern set A1 (facial image), and the facial images of the identifications taken by image scanner 2 are stored in memory 4 as pattern set B1 (a photo on an identification). Respective pattern sets are converted to one-dimensional data sequence, i.e., pattern A1 and pattern B1, and they are stored in pattern memories 7, 8 (S41).

Feature-extraction-matrices AF, BF are calculated following the steps of S42–S44. First, within-class scatter matrix Ca–w and between-class scatter matrix Ca–b of pattern set A1 are calculated following equations 1, 2. At the same time, within-class scatter matrix Cb–b of pattern set B1 is calculated following equation 3 (S42). Then cross-correlation matrix Cab–r of pattern sets A, B is calculated following equation 4 (S43).

Next, feature-extraction-matrices AF, BF are calculated following equations 5, 6 with respect to pattern sets A1, B1.

The validity of these feature-extraction-functions are described as follows: First, between Cab–r and matrix Cab–w, a relation shown by equation 8 exists. Within-class scatter matrix Cab–w shown by equation 7 extends over pattern set A1 and pattern set B1. In this connection, the minimization of Cab–w is equivalent to the minimization of Ca–b and Cb–b, as well as the maximization of Cab–r.

Assessment standard S shown by equation 9 minimizes the within-class scatter of respective pattern sets A1, B1, and is maximized when it maximizes the between-class scatter only when the scatter extends over two pattern sets A1, B1.

Feature extraction functions fa=AF(X^a), fb=BF(X^b), which maximize assessment standard S, agree with feature extraction matrices AF, BF which maximize equation 10. One of quasi-optimum feature-extraction-matrices is AF or BF shown by equa. 5 or 6. These matrices maximize equation 10. The descriptions above have discussed the off-line process.

Figure 5:
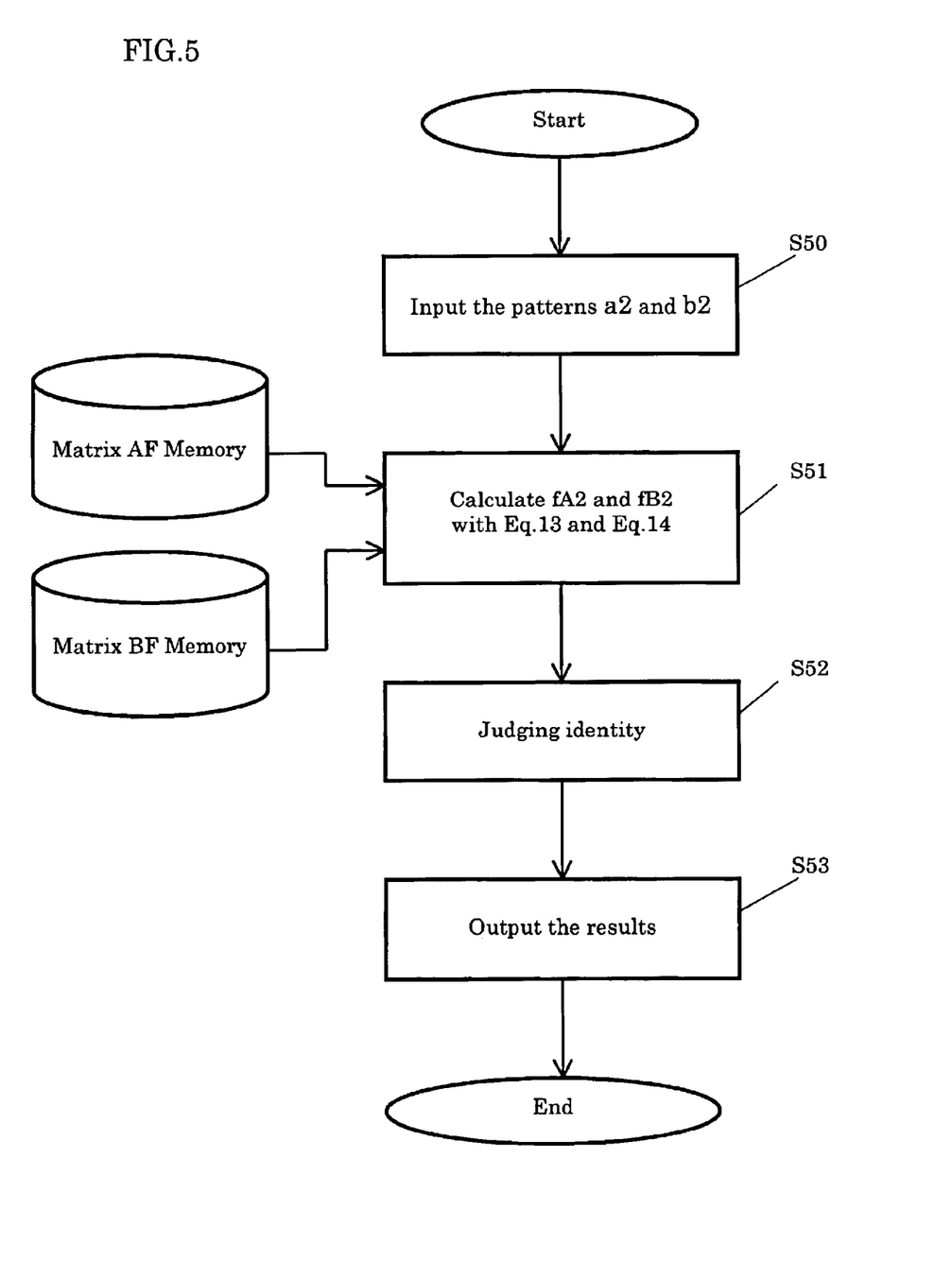
FIG. 5 is a flowchart illustrating an operation of on-line facial image check using a pattern check method of the present invention.

Next, the on-line process is demonstrated with reference to FIG. 5. The purpose of the off-line process is to determine whether or not the facial image of an identification supplied from image scanner 2 is identical with the facial image taken by video camera 1.

The facial image shot with video camera 1 undergoes A/D conversion, and is stored in image memory 3, and the facial image taken by image scanner 2 is stored in image memory 4. These facial images are retrieved from the memory, and converted to, e.g., one-dimensional data sequences, then they are stored in pattern memories 7, 8 (S50).

Next, feature-extraction-matrices AF, BF found in the off-line process and stored in memory 19, 20 are applied to patterns "a2", "b2" stored in memory 7, 8, then feature vector "fA2", "fB2" are found using equations 13, 14 (S51).

$$fA2=AF(a2) \quad \text{equa. 13}$$

$$fB2=BF(b2) \quad \text{equa. 14}$$

Determine, then, whether or not these facial images are identical based on the similarity measure of feature vectors fA2, fB2. In other words, determine whether these facial images are derived from the same class (S52). The determination result (Y/N) is output to output terminal 18 for a pattern check (S53).

In the descriptions discussed above, facial image data, pattern sets A1, B1 are obtained in the off-line process; however, they have been stored in secondary memory device 10 and can be retrieved therefrom. Further, those data obtained in the off-line process can be stored in secondary memory device 10 and they can be updated.

On the premise that there are different distributions between pattern sets to be compared with, the present invention carries out an optimum feature extraction which satisfies a consistent standard, i.e., within-class scatter extending over two distributions is minimized and between-class scatter is maximized with respect to the two distributions respectively. As a result, a pattern recognition with higher accuracy than that through the conventional method, as well as a pattern check, can be realized.

What is claimed is:

1. A method of pattern recognition, said method comprising the steps of:
    a first step for finding feature-extraction-matrix AF of pattern set A1 and feature-extraction-matrix BF of pattern set B1, said matrices AF, BF maximizing between-class scatter and minimizing within-class scatter with respect to training pattern sets A1, B1 respectively, which are sets of pair of patterns obtained from a same object but on different conditions;
    a second step for calculating feature-amount fB1i using the feature-extracting-matrix BF with respect to typical pattern B1i of respective classes "i" of the training pattern set B1;
    a third step for retaining a set {fB1i} of the feature amount fB1i and the matrices AF, BF in a referential database; and
    a fourth step for determining an element, among the feature amount fB1i retained in the referential database, most similar to a feature amount fA2j extracted from the matrix AF applied to input pattern A2j.

2. The method of pattern recognition of claim 1, wherein the feature-extraction-matrices AF, BF are calculated through the steps of:
    estimating between-class scatters Ca–b, Gb–b of the pattern sets A1, B1 and within-class scatter Ca–w of the pattern set A1 from the training pattern sets A1, B1;
    calculating within-class scatter Cab–w and between-class scatter Cab–b, both extending over the pattern sets A1, B1, based on a set of pair of elements corresponding to the pattern sets A1, B1; and
    calculating a feature-extraction-function which maximizes Ca–b, Cb–b, and Cab–b out of the five statistical amounts, i.e., Ca–b, Gb–b, Ca–w, Cab–w, Cab–b, and minimizes Ca–w, Cab–w.

3. The method of pattern recognition of claim 1, wherein the pattern set A1 is obtained through shooting an object with a video camera, and the pattern set B1 is obtained through taking an object with an image scanner.

4. The method of pattern recognition of claim 3, wherein the pattern set A1 is formed by a plurality of images with respect to one object, and the pattern set B1 is formed by a single photo with respect to one object.

5. The method of pattern recognition of claim 1, wherein the steps 1, 2 and 3 are done in off-line process and the step 4 is done in on-line process.

6. A method of pattern recognition according to claim 1, wherein said between-class scatter is for different objects in said pattern sets, respectively.

7. A method of pattern check, said method comprising the steps of:
    a first step for finding feature-extraction-matrix AF of pattern set A1 and feature-extraction-matrix BF of pattern set B1, said matrices AF, BF maximizing between-class scatter and minimizing within-class scatter with respect to the training pattern sets A1, B1 which are sets of pair of patterns obtained from a same object but on different conditions;
    a second step for calculating feature amounts "fa", "fb" of input patterns "a", "b" using the matrices AF, BF; and
    a third step for determining whether or not the input patterns "a", "b" derive from a same class based on similarity measure of the feature amounts "fa", "fb".

8. The method of pattern check of claim 7, wherein the feature-extraction-matrices AF, BF are calculated through the steps of:
    estimating between-class scatters Ca–b, Gb–b of the pattern sets A1, B1, which are sets of patterns obtained on different conditions, and within-class scatters Ca–w, Cb–w of the pattern sets A1, B1;
    calculating within-class scatter Cab–w and between-class scatter Cab–b, both extending over the pattern sets A1, B1, based on a set of pair of elements corresponding to the pattern sets A1, B1; and
    calculating a feature-extraction-function which maximizes Ca–b, Cb–b, and Cab–b out of the six statistical amounts, i.e., Ca–b, Cb–b, Ca–w, Cb–w, Cab–w, Cab–b, and minimizes Ca–w, Cb–w, Cab–w.

9. The method of pattern recognition of claim 7, wherein the pattern set A1 is obtained through shooting an object with a video camera, and the pattern set B1 is obtained through taking an object with an image scanner.

10. The method of pattern recognition of claim 9, wherein the pattern set A1 is formed by a plurality of images with respect to one object, and the pattern set B1 is formed by a single photo with respect to one object.

11. The method of pattern recognition of claim 7, wherein the first step is done in off-line process and the second and third steps are done in on-line process.

12. A method of pattern check according to claim 7, wherein said between-class scatter is for different objects in said pattern sets, respectively.

13. A pattern recognition apparatus comprising:
(a) pattern input means for obtaining training-pattern-sets A1, B1, which are sets of pair of patterns, from a same object but on different conditions;
(b) a feature-extraction-matrix generating unit for finding feature-extraction-matrix AF of the pattern set A1 and feature-extraction-matrix BF of the pattern set B1, both matrices AF, BF maximizing between-class scatter and minimizing within-class scatter with respect to the pattern sets A1, B1;
(c) a feature-amount calculating unit for calculating a feature amount fB1i using the feature-extraction-matrix BF with respect to typical pattern B1i of each class "i" of the training pattern set B1;
(d) transfer means for transferring a set {fB1i} of the feature amount fB1i and the feature-extraction-matrix BF to referential database FB1; and
(e) optimum matching determination means for selecting an element most similar to feature amount fA2j from the database by applying the feature-extraction-matrix AF to pattern A2j input, the feature amount fA2j being extracted after applying the matrix AF to the pattern A2j.

14. The pattern recognition apparatus of claim 13, wherein said feature-extraction-matrix generating unit including:
(b-1) an estimating unit for estimating between-class scatters Ca–b, Cb–b in the pattern sets and within-class scatter Ca–w of the pattern set A1 from the pattern sets A1, B1;
(b-2) a scatter calculating unit for calculating within-class scatter Cab–w and between-class scatter Cab–b, both scatters extending over the pattern sets A1, B1, from sets of a pair of elements corresponding to the pattern sets A1, B1; and
(b-3) a feature-extracting-function unit for calculating a feature-extracting-function which maximizes Ca–b, Cb–b, Cab–b out of five statistical amounts, i.e., Ca–b, Cb–b, Ca–w, Cab–w, Cab–b, and minimizes Ca–w, Cab–w.

15. The pattern recognition apparatus of claim 13, wherein the pattern set A1 is obtained through shooting an object with a video camera, and the pattern set B1 is obtained through taking an object with an image scanner.

16. The pattern recognition apparatus of claim 15, wherein the pattern set A1 is formed by a plurality of images with respect to one object, and the pattern set B1 is formed by a single photo with respect to one object.

17. A pattern recognition apparatus according to claim 13, wherein said between class scatter is for different objects in said pattern sets, respectively.

18. A pattern check apparatus comprising:
(a) a pattern inputting unit for obtaining training pattern sets A1, B1, which are sets of pair of patterns, from a same object but on different conditions;
(b) a feature-extraction-matrix generating unit for finding feature-extraction-matrix AF of the pattern set A1 and feature-extraction-matrix BF of the pattern set B1, both matrices AF, BF maximizing between-class scatter and minimizing within-class scatter with respect to the pattern sets A1, B1;
(c) a feature-extracting-unit for calculating respective feature amounts "fa", "fb" using the feature-extracting-matrices AF, BF from input pattern "a", "b" supplied from said pattern input unit;
(d) an identity determination unit for determine whether or not the input patterns "a", "b" are derived from the same class based on similarity measure of the feature amounts "fa", "fb".

19. The pattern check apparatus of claim 18, wherein said feature-extraction-matrix generating unit including:
(b-1) an estimating unit for estimating between-class scatters Ca–b, Cb–b and within-class scatter Ca–w, Gb–w from the pattern sets A1, B1 respectively;
(b-2) a scatter calculating unit for calculating within-class scatter Cab–w and between-class scatter Cab–b, both scatters extending over the pattern sets A1, B1, from sets of a pair of elements corresponding to the pattern sets A1, B1; and
(b-3) a feature-extracting-function unit for calculating a feature-extracting-function which maximizes Ca–b, Gb–b, Cab–b out of six statistical amounts, i.e., Ca–b, Cb–b, Ca–w, Gb–w, Cab–w, Cab–b, and minimizes Ca–w, Cab–w, Cab–w.

20. The pattern check apparatus of claim 18, wherein the pattern set A1 is obtained through shooting an object with a video camera, and the pattern set B1 is obtained through taking an object with an image scanner.

21. The pattern check apparatus of claim 20, wherein the pattern set A1 is formed by a plurality of images with respect to one object, and the pattern set B1 is formed by a single photo with respect to one object.

22. A pattern check apparatus according to claim 18, wherein said between-class scatter is for different objects in said pattern sets, respectively.

23. A recording medium which records a program of recognizing a pattern by a computer, said program carrying out the processes of:
(a) a process for finding feature-extraction-matrix AF of pattern set A1 and feature-extraction-matrix BF of pattern set B1, said matrices AF, BF maximizing between-class scatter and minimizing within-class scatter with respect to the training pattern sets A1, B1 which are sets of pair of patterns obtained from a same object but on different conditions;
(b) a process for calculating feature amount "fB1i" using the feature-extracting-matrix BF with respect to typical pattern "B1i" of respective classes "i" of the training pattern set B1;
(c) a process for retaining a set {fB1i} of the feature amount fB1i and the matrices AF, BF in a referential database; and (d) a process for determining an element, among the feature amount fB1i retained in the referential database, most similar to a feature amount fA2j extracted from the matrix AF applied to input pattern A2j.

24. A recording medium according to claim 23, wherein said between-class scatter is for different objects in said sets, respectively.

25. A recording medium which records a program of checking a pattern by a computer, said program carrying out the processes of:

(a) a process for finding feature-extraction-matrix AF of pattern set A1 and feature-extraction-matrix BF of pattern set B1, the matrices AF, BF maximizing between-class scatter and minimizing within-class scatter with respect to the training pattern sets A1, B1 which are sets of pair of patterns obtained from a same object but on different conditions;

(b) a process for calculating feature amounts "fa", "fb" of input patterns "a", "b" using the matrices AF, BF; and (c) a process for determining whether or not the input patterns "a", "b" derive from a same class based on similarity measure of the feature amounts "fa", "fb".

26. A recording medium according to claim 25, wherein said between-class scatter is for different objects in said sets, respectively.

* * * * *

UNITED STATES PATENT AND TRADEMARK OFFICE
CERTIFICATE OF CORRECTION

PATENT NO. : 6,865,296 B2
DATED : June 5, 2001
INVENTOR(S) : Kenji Nagao

It is certified that error appears in the above-identified patent and that said Letters Patent is hereby corrected as shown below:

Column 3,
Line 56, "(IFs)" should read -- (I/Fs) --.

Column 4,
Line 37, "("I"th person)" should read -- ("i"th person) --.

Column 8,
Lines 15, 24 and 57, "Gb-b" should read -- Cb-b --.

Column 10,
Lines 27 and 36, "Gb-w" should read -- Cb-w --.
Line 35, "Gb-b" should read -- Cb-b --.

Signed and Sealed this

Twenty-fourth Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,865,296 B2
DATED : March 8, 2005
INVENTOR(S) : Kenji Nagao

Page 1 of 1

It is certified that error appears in the above-identified patent and that said Letters Patent is hereby corrected as shown below:

<u>Column 3,</u>
Line 56, (IFs)" should read -- (I/Fs) --.

<u>Column 4,</u>
Line 37, "("I"th person)" should read -- ("i"th person) --.

<u>Column 8,</u>
Lines 15, 24 and 57, "Gb-b" should read -- Cb-b --.

<u>Column 10,</u>
Lines 27 and 36, "Gb-w" should read -- Cb-w --.
Line 35, "Gb-b" should read -- Cb-b --.

This certificate supersedes Certificate of Correction issued January 24, 2006.

Signed and Sealed this

Thirteenth Day of June, 2006

JON W. DUDAS
*Director of the United States Patent and Trademark Office*